(12) United States Patent
Seal

(10) Patent No.: US 8,634,406 B2
(45) Date of Patent: Jan. 21, 2014

(54) SYSTEMS AND METHODS FOR NETWORK ROUTING USING VIRTUAL NETWORK NODE LOCATIONS

(75) Inventor: Brian Keith Seal, Powell, TN (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 440 days.

(21) Appl. No.: 12/165,996

(22) Filed: Jul. 1, 2008

(65) Prior Publication Data

US 2010/0002709 A1    Jan. 7, 2010

(51) Int. Cl.
   *H04L 12/28*   (2006.01)
   *H04L 12/56*   (2011.01)

(52) U.S. Cl.
   USPC .......................... 370/351; 370/254; 370/400

(58) Field of Classification Search
   USPC .................. 370/254, 428, 315, 238, 351, 400
   See application file for complete search history.

(56) References Cited

U.S. PATENT DOCUMENTS

| | | | |
|---|---|---|---|
| 4,939,726 A | 7/1990 | Flammer et al. | |
| 5,636,216 A | 6/1997 | Fox et al. | |
| 6,744,740 B2 * | 6/2004 | Chen | 370/255 |
| 6,829,230 B1 * | 12/2004 | Tiuri | 370/351 |
| 6,959,189 B2 * | 10/2005 | Cotanis | 455/436 |
| 7,515,544 B2 * | 4/2009 | Nambisan et al. | 370/238 |
| 7,593,376 B2 * | 9/2009 | D'Amico et al. | 370/338 |
| 7,672,281 B1 * | 3/2010 | Humphries et al. | 370/338 |
| 7,725,597 B2 * | 5/2010 | Takeda et al. | 709/238 |
| 7,787,429 B2 * | 8/2010 | Jeon et al. | 370/338 |
| 7,957,355 B1 * | 6/2011 | Heiferling et al. | 370/338 |
| 8,085,792 B1 * | 12/2011 | Aly | 370/400 |
| 2003/0152045 A1 * | 8/2003 | Martin, IV | 370/328 |
| 2004/0081153 A1 * | 4/2004 | Mayer et al. | 370/392 |
| 2004/0248589 A1 * | 12/2004 | Gwon et al. | 455/456.1 |
| 2005/0018645 A1 * | 1/2005 | Mustonen et al. | 370/349 |
| 2005/0100027 A1 * | 5/2005 | Leinwand et al. | 370/400 |
| 2005/0190717 A1 * | 9/2005 | Shu et al. | 370/328 |
| 2007/0097966 A1 * | 5/2007 | Scoggins et al. | 370/389 |
| 2008/0037536 A1 * | 2/2008 | Padmanabhan et al. | 370/389 |
| 2008/0123586 A1 * | 5/2008 | Manser | 370/328 |
| 2009/0016224 A1 * | 1/2009 | De et al. | 370/238 |
| 2012/0071136 A1 * | 3/2012 | Clark et al. | 455/412.2 |

* cited by examiner

*Primary Examiner* — Ayaz Sheikh
*Assistant Examiner* — Hoang-Chuong Vu
(74) *Attorney, Agent, or Firm* — Kilpatrick Townsend & Stockton LLP

(57) ABSTRACT

Systems and methods for routing packets using node virtual locations are disclosed. Such a virtual location may be determined, for example, by determining a geographic location that is central to other nodes with which the node can communicate. In certain embodiments, a node's virtual location may more accurately represent an approximate center point of a node's communication range. In one exemplary embodiment, a node's virtual location is an average of the geographic locations of radio nodes with which the node is in communication.

22 Claims, 4 Drawing Sheets

IDENTIFYING A PACKET DESTINATION NODE ON A NETWORK AND A GEOGRAPHIC LOCATION OF THE PACKET DESTINATION NODE    *410*

SELECTING A NEXT NODE FROM CANDIDATE NEXT NODES IN COMMUNICATION WITH A SENDING NODE, WHEREIN THE NEXT NODE IS SELECTED USING LOCATIONS ASSOCIATED WITH THE CANDIDATE NEXT NODES AND THE GEOGRAPHIC LOCATION OF THE PACKET DESTINATION NODE, AT LEAST ONE OF THE LOCATIONS OF THE CANDIDATE NEXT NODES COMPRISING A VIRTUAL LOCATION    *420*

SENDING THE PACKET FROM THE SENDING NODE TO THE NEXT NODE    *430*

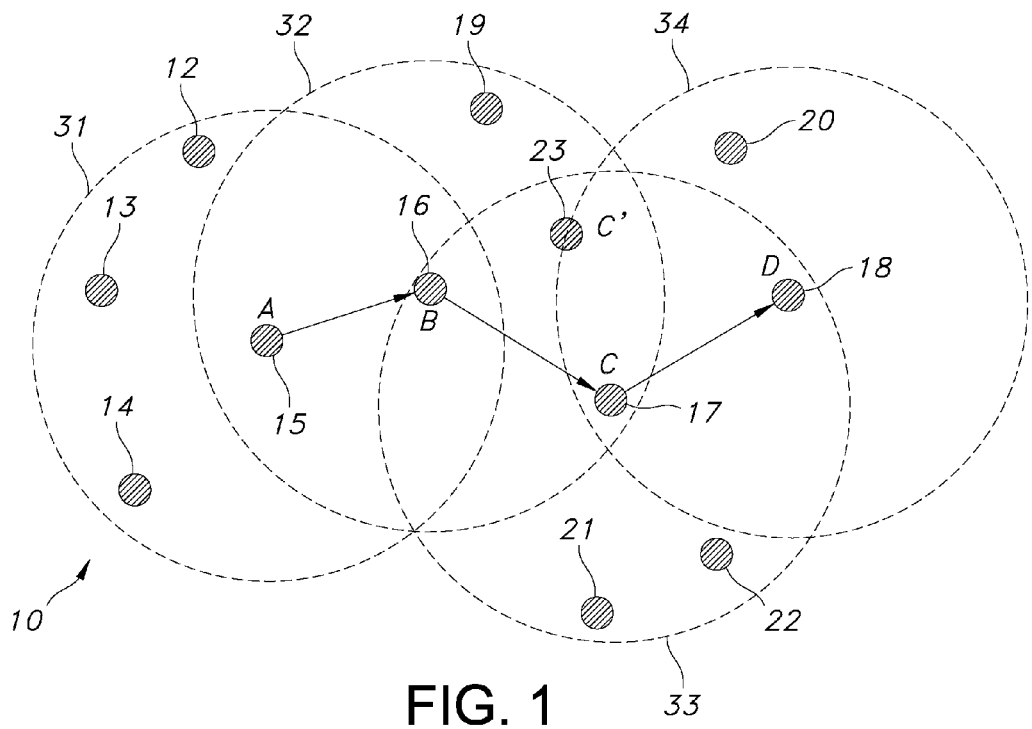
FIG. 1
*(PRIOR ART)*
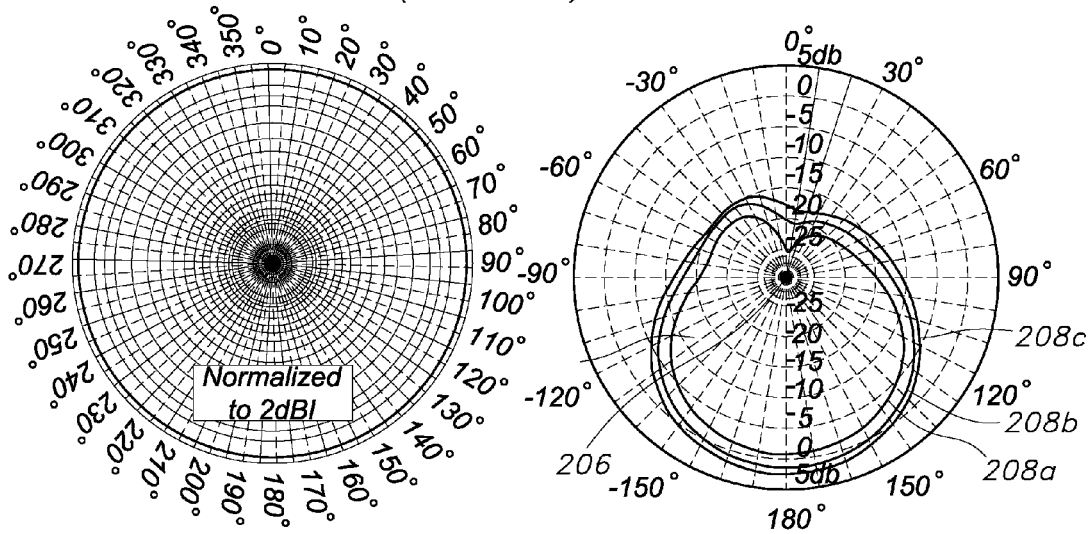
Azimuthal Pattern (Z,Y or E-Plane)
FIG. 2A
*(PRIOR ART)*
FIG. 2B
*(PRIOR ART)*

SYSTEMS AND METHODS FOR NETWORK ROUTING USING VIRTUAL NETWORK NODE LOCATIONS

TECHNICAL FIELD

This disclosure relates generally to network routing, and specifically relates to methods and systems for determining a network route path.

BACKGROUND

Various methods are known for routing network packets. For example, U.S. Pat. No. 4,939,726 entitled "Method for routing packets in a packet communication network," which is incorporated by this reference, describes forwarding packets from a source node to a target node via a series of intermediates using the target node's geographic coordinates. Each intermediate node selects a successor node using, among other things, the maximum forward geographic progress attainable, which is determined by calculating a metric incorporating the geographical distance between the coordinates of the target node and the coordinates of each potential successor node. Similarly, U.S. Pat. No. 5,636,216, entitled "Method for translating IP addresses to other distributed network addressing schemes," which is incorporated by this reference, describes using a network specific local address of a target node that incorporates the target's geographic coordinates.

Some networks are configured to determine and use radio nodes with latitude and longitude coordinates, which are shared amongst the radios of the network, for example, as radios discover one another. A radio uses the coordinate information about its neighbors to independently determine how to best route each packet based on the packet's final destination, for example by attempting to determine to which of the neighbors a packet should be sent in order to move it closest to the final destination. FIG. 1 illustrates one such exemplary network 10 comprised of various radios 12, 13, 14, 15, 16, 17, 18, 19, 20, 21, 22, 23. For illustrative purposes, the ranges of radios A-D 15, 16, 17, 18 are illustrated by circles 31, 32, 33, 34, respectively. When a packet originates at radio A 15 that is destined for radio D 18, an algorithm considers the radios 12, 13, 14, 16 within radio A's range 31 and selects radio B 16 because it is the closest to the destination D 18. Once the packet arrives at radio B 16, an algorithm considers the available alternatives and selects radio C 17 because it is physically closest to the destination D 18. Once the packet arrives at C 17, the destination is directly reachable. While these techniques offer many advantages, especially when radio range patterns are relatively circular 204 about a radio 202 as shown in FIG. 2a, with radio range extending approximately the same distance in all directions, various problems arise when one or more radio nodes in a network have different range patterns such as asymmetrical patterns 208a-c about a radio 206 as shown in FIG. 2b. For example, such patterns may occur when a radio is under glass or otherwise obstructed within a utility meter.

SUMMARY OF THE INVENTION

Systems and methods for routing packets using node virtual locations are disclosed. A virtual location may be determined, for example, by determining a geographic location that is central to other nodes with which the node can communicate. In certain embodiments, a node's virtual location may more accurately represent an approximate center point of a node's communication range. A node's virtual location may be an average of the geographic locations of radio nodes with which the node is in communication. One exemplary method comprises identifying a packet destination node on a network and its geographic location. The method further comprises selecting a next node for a packet sent from a sending node on the way to the packet destination node. The next node is selected from candidate next nodes in communication with the sending node by comparing or otherwise using the candidate nodes' locations, e.g., by determining the node closest (or virtually closest) to the location of the packet destination node. One or more of the locations of the candidate next nodes may comprise a virtual location. Once a next node is selected, the method further comprises sending the packet from the sending node to the next node.

These embodiments are provided as examples to aid understanding. Additional embodiments and advantages are also discussed in the Detailed Description and will become readily apparent to those skilled in the art. The invention is capable of other and different embodiments, and its several details are not essential, but rather are capable of modifications in various obvious respects, all without departing from the invention. Accordingly, the drawings and description are to be regarded as illustrative, and not as restrictive.

BRIEF DESCRIPTION OF THE FIGURES

The above described and other features, aspects, and advantages of the present disclosure are better understood when the following Detailed Description is read with reference to the accompanying drawings, wherein:

FIG. 1 illustrates an example of prior art geographic-based network routing in an exemplary network;

FIGS. 2a-b illustrate differences in radio range patterns;

DETAILED DESCRIPTION

Figure 3:
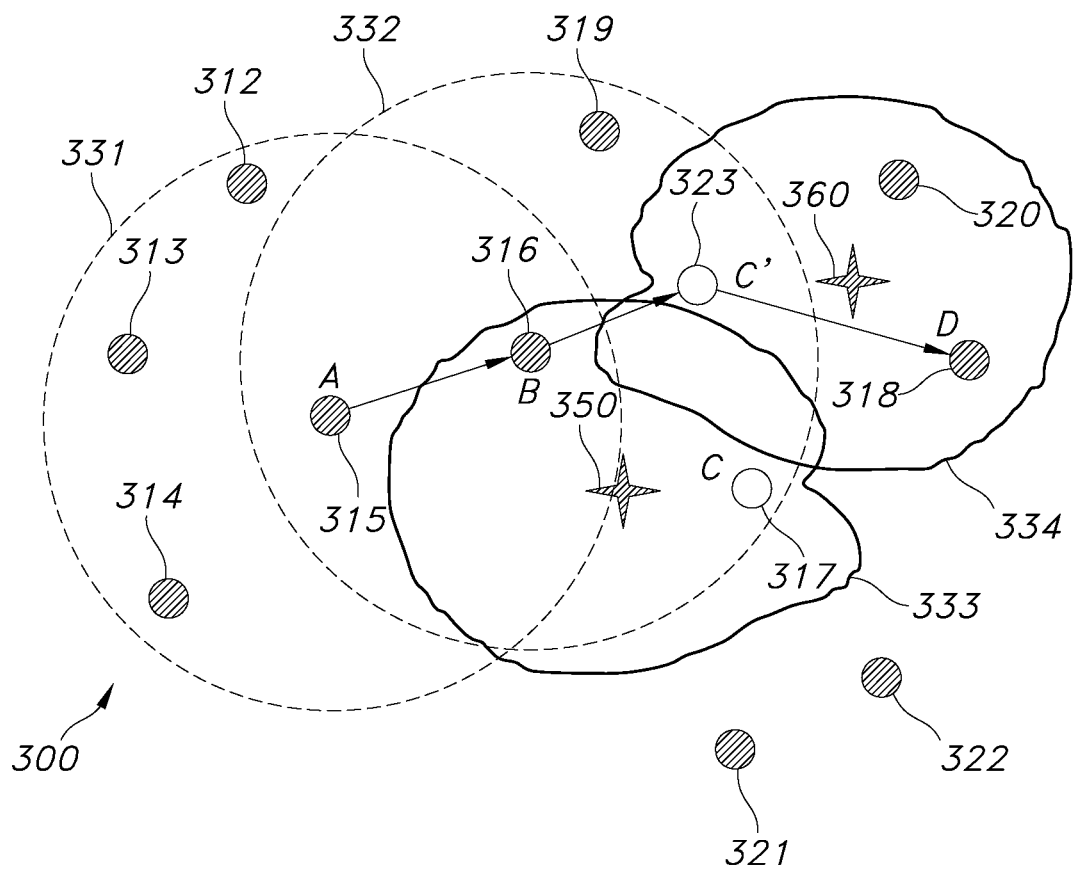
FIG. 3 illustrates exemplary routing in a network according to certain embodiments.

Certain embodiments provide improvements to network routing methods and systems by facilitating the routing of packets using node virtual locations. A virtual location may be determined, for example, by determining a geographic location that is central to other nodes with which the node can communicate. The node's virtual location may more accurately represent an approximate center point of a node's communication range. In one exemplary embodiment, a node's virtual location is an average of the geographic locations of radio nodes with which the node is in communication.

In an exemplary radio frequency (RF) network of certain embodiments, each radio node calculates a virtual or "RF equivalent" position by averaging the latitudes and longitudes of the actual physical positions of each radio that it can see. For example, in a given metering network, each endpoint radio node may be able to see 5 to 25 other radios, making the calculation of a virtual location relatively simple. As an example, radio X may be in communication with five other radios: radio A, radio B, radio C, radio D, radio E. Radio X may receive geographic information identifying the geographic location of each of these radios. For example, such information may be sent directly to radio X from each of the other radios, e.g., radio A sends a packet to radio X that includes the geographic location of radio A, etc. In one embodiment, as radios discover or communicate with one another, the radios exchange both actual position and virtual location information. The actual position (i.e., geographic location) could be included, for example, as part of a radio node's unique identifier.

A node's virtual location may change over time as the nodes with which it is able to communicate changes. A node may, for example, update its virtual location whenever a new neighbor is discovered and/or whenever contact with an existing neighbor is lost. Repeatedly or continuously reassessing a virtual location may occur, for example, when link maintenance is done; providing, in certain cases, up to the second/dynamic virtual locations. One advantage of repeatedly updating a virtual location is that the location will then provide information about a node's current communication capabilities that can be utilized in making routing decisions. For example, the node's virtual location can reflect the fact that a metal trash can distorts the node's range pattern during certain times of the day or week.

Table A illustrates exemplary geographic locations for radio X's five neighboring nodes.

TABLE A

| Radio | Actual (Geographical) Position |
|---|---|
| Radio A | 24 Latitude, 56 Longitude |
| Radio B | 62 Latitude, 18 Longitude |
| Radio C | 33 Latitude, 28 Longitude |
| Radio D | 46 Latitude, 8 Longitude |
| Radio E | 14 Latitude, 37 Longitude |

Even though radio X's geographic location is 12 latitude, 27 longitude, its virtual location is 35.8 latitude, 29.4 longitude based on the average geographic locations of the nodes with which it can communicate. This virtual location may be a better location to use in making geographic-based and other network routing decisions because the virtual location may provide a more accurate or at least more useful center point of the Radio X's actual communication range. While this embodiment utilizes latitude/longitude coordinates, certain embodiments may utilize, in addition or in the alternative, additional coordinate systems or other location identifying information, including but not limited to, elevation information, polar coordinates (bearing/distance), and spherical 3-d coordinates. In addition, geographic-based and other network routing decisions may weight certain geographic location attributes greater than others. For example, latitude may be given a greater weight than longitude in a system that uses latitude and longitude coordinates.

FIG. 3 illustrates exemplary routing in a network 300 according to certain embodiments. The network includes various radio nodes 312, 313, 314, 215, 316, 317, 318, 319, 320, 321, 322 shown in FIG. 3 for illustrative purposes and additional radio nodes (not shown) that may affect the determination of a node's virtual location.

FIG. 3 illustrates a packet originating at radio A 315 and routed to radio D, the packet's final destination node. Radio A 315 determines that radio D 318 is the final destination node for the packet and identifies a geographic location of radio D 318, for example by extracting the location coordinates from an identifier of radio D 318. Thus, for example, if radio A 315 is responding to a request from radio D 318, radio A 315 may take the radio D 318 address from a request packet and extract the geographic coordinates of radio D 318. Other techniques may of course be used to retrieve or otherwise identify the geographic address of a destination node.

Given the geographic location of radio D 318, radio A 315 determines a node to which it will send the packet. As shown in FIG. 3, radio A 315 has a range pattern 331 and can consider at least four nodes 312, 313, 314, 316 with which it is in communication as candidate nodes to which it will send the packet. In this case, radio A 315 does not have virtual location information for any of the four candidate nodes, and thus uses their geographic locations to make its routing determination. In this case, radio B 316 is selected as the next node because its geographic location is the closest to the destination radio D 318. The packet is sent to radio B 316.

Radio B receives the packet and determines the packet's destination radio and its geographic location. For example, the identity of the destination radio may be provided as an identifier in the packet itself. The packet may also comprise geographic coordinates of the destination node, for example, within the destination node identifier.

Given the geographic location of radio D 318, radio B 316 determines a next node to which it will send the packet. As shown in FIG. 3, radio B 316 has a range pattern 332 and can consider at least four nodes 315, 319, 323, 317 with which it is in communication as candidate nodes to which it will send the packet. In this case, radio B 316 has virtual locations for radio C 317 and radio C' 323 and can use this information in making routing decisions. Radio C' 316 is selected as the next node because its virtual location is the closest to the destination radio D 318 geographic location. The packet is sent to radio C' 323. Note that radio C 317 may have been geographically closer to radio D 318, but that the virtual location 360 of radio C' 323 is closer to radio D 318 than the virtual location 350 of radio C 317. Such a result may occur as the result of, for example, one of the radios having more gain in a given direction than the other. In this case, the routing is more efficient, because the packet can be sent directly from radio C' 323 to radio D 318, but could not have been sent directly from radio C 317 to radio D 318, as shown by their respective radio patterns 334, 333.

Certain embodiments use virtual location determinations for all nodes. Certain embodiments use virtual locations whenever such location information is available for a given node being considered. In certain embodiments, if a radio does not have a sufficient number of neighbors to allow an accurate calculation of virtual location, the geographical position can be advertised as both actual and virtual. For example, this may be used during initiation of a new node, during the period in which it begins to discover its neighboring nodes.

Generally, in many embodiments, a virtual location is determined using only actual geographic locations to avoid instability that may result if virtual locations are used to determine other virtual locations. However, virtual-based-on-virtual techniques may be used in certain embodiments, for example, where there are many omni-directional antenna nodes used in a very dense mesh network and the actual position and the virtual location are approximately the same in the vast majority of cases.

Virtual locations may be determined in a variety of ways. As examples, in addition to the direct linear average method, a virtual location may be calculated as a mean or a centroid of neighboring node coordinates. In addition, a determination of a virtual location may exclude certain nodes, such as nodes that are located more than a certain distance away. A determination of a virtual location may also take into account packet success rate and/or tickle success rate. For example, a determination of a virtual location may use a list of neighbors. Such a list may comprise, as examples, all neighbors the node has ever heard from, a subset of such neighbors based on success rate or tickle rate, or a subset based on date/time of most recent communication. In one embodiment, a list of neighbor locations also includes the node's own geographic location. This may be useful, among other reasons, during a startup or reboot when a node must tell another node its virtual location prior to hearing from any other nodes—the virtual location that it provides in such circumstances will be its own geographic location.

Exemplary Method of Routing Using Virtual Node Locations

Figure 4:
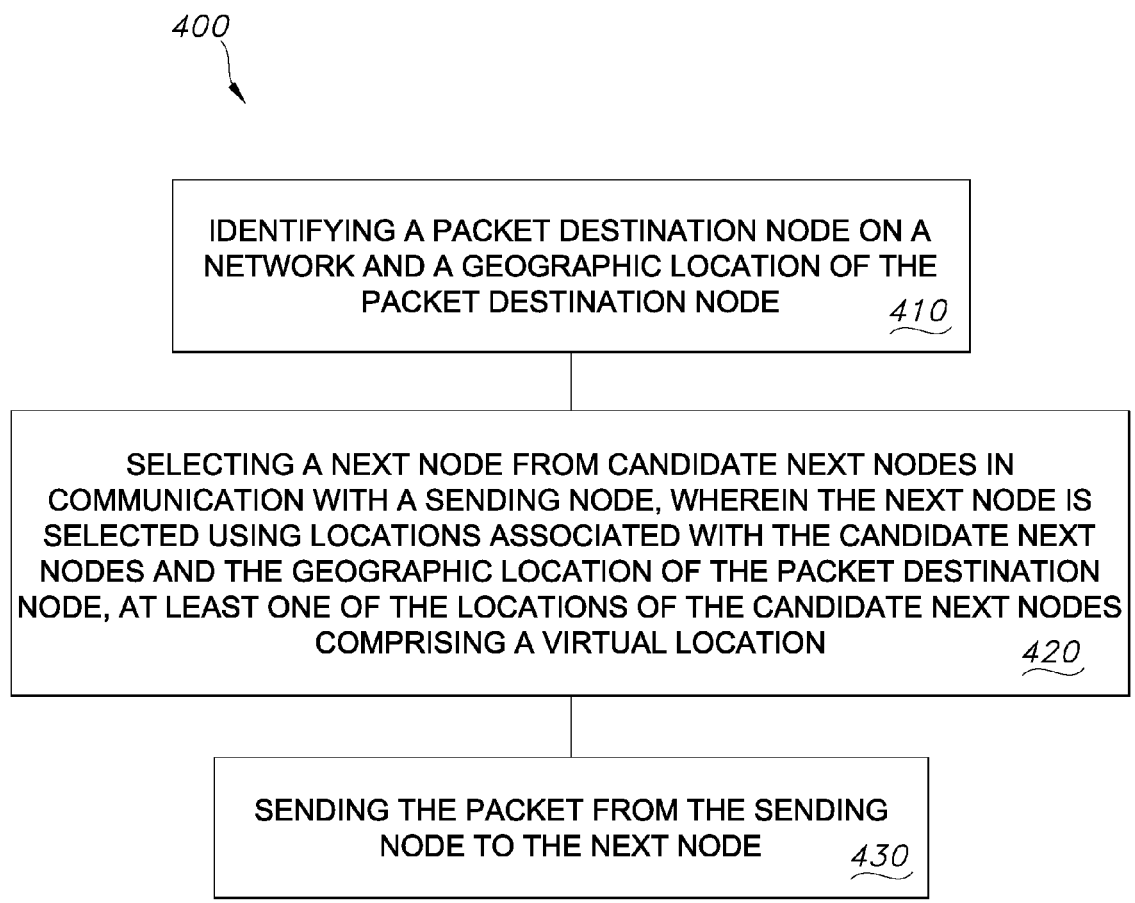
FIG. 4 illustrates an exemplary method of routing according to certain embodiments.

FIG. 4 illustrates an exemplary method 400 of routing according to certain embodiments. The method 400 comprises identifying a packet destination node on a network and a geographic location of the packet destination node, as shown in block 410. For example, identifying the packet destination node may comprise retrieving a node identifier from the packet itself. Such a node identifier may also identify the geographic location of the packet destination node. Generally, identifying the geographic location of the packet destination node may comprise retrieving a location identifier from the packet or from another source of information at the sending node or elsewhere on the network. The location identifier may comprise any type of information including, but not limited to, geographic coordinates such as latitude and longitude coordinates.

The method 400 further comprises selecting a next node from candidate next nodes in communication with a sending node, wherein the next node is selected using locations associated with the candidate next nodes and the geographic location of the packet destination node, at least one of the locations of the candidate next nodes comprising a virtual location associated with a candidate next node, as shown in block 420. A virtual location may be determined in a variety of ways. For example, it may be determined using geographic locations of network nodes in communication with the candidate next node, for example, by averaging the geographic location coordinates of network nodes in communication with the candidate next node.

The virtual location may be determined using a deployment characteristic of an antenna associated with the candidate next node. For example, a virtual location may be based on an adjusted geographic location (e.g., the geographic location offset a specified amount in a direction of known antenna bias).

The next node may be selected in a variety of ways. For example, it may be selected by comparing distances between the locations associated with the candidate next nodes and the geographic location of the packet destination node. The next node may be selected because a location associated with the selected next node is closer to the geographic location of the packet destination node than others or all of the candidate nodes.

The method 400 further comprises sending the packet from the sending node to the selected next node, as shown in block 430. A similar process may be repeated at the next node for determining another node on the way to the destination node.

Figure 5:
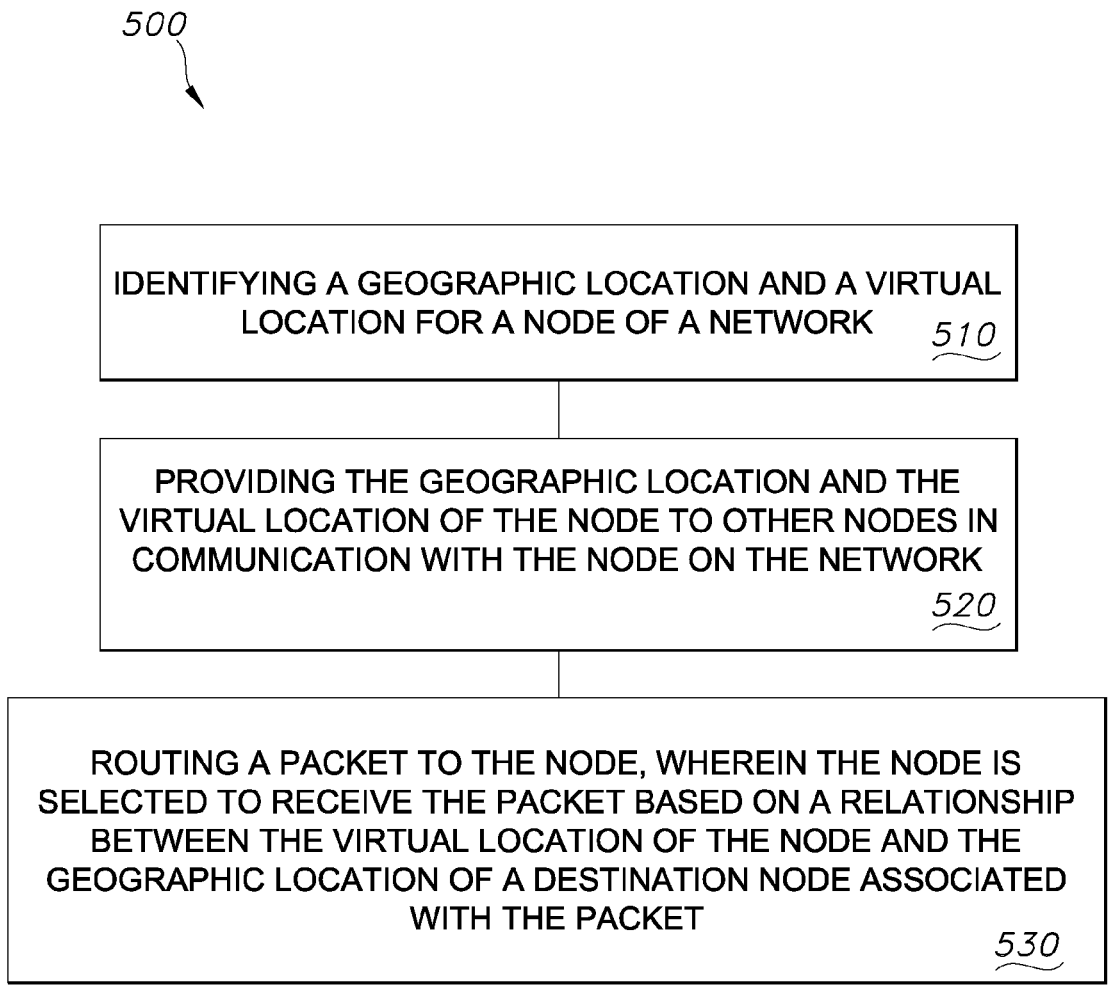
FIG. 5 illustrates another exemplary method of routing according to certain embodiments.

Exemplary Method of Sharing Location Information and Using Such Information in Network Routing FIG. 5 illustrates another exemplary method 500 of routing according to certain embodiments. The method 500 comprises identifying a geographic location and a virtual location for a node of a network, as shown in block 510.

The method 500 further comprises providing the geographic location and the virtual location of the node to other nodes in communication with the node on the network, as shown in block 520.

The method 500 further comprises routing a packet to the node, wherein the node is selected to receive the packet based on a relationship between the virtual location of the node and the geographic location of a destination node associated with the packet, as shown in block 530. The node may be selected to receive the packet using the virtual location of the node, virtual locations of other nodes, and/or geographic locations of other nodes.

The method 500 may further comprise determining the virtual location that is provided to other nodes, the virtual location determined using the geographic locations of network nodes in communication with the node, for example, by averaging the geographic locations of network nodes in communication with the node. The method 500 may comprise determining the virtual location using a deployment characteristic of an antenna associated with the node.

Exemplary Network Node Components

An exemplary system comprises a network of nodes communicating with each other through radio communication and/or other communication techniques. Some or all of the nodes of the network may, as an example, each comprise a virtual location component for determining a virtual location to be associated with the node. A node may further comprise an information sharing component for sharing location information with neighboring nodes, the location information comprising the virtual location. An information sharing component may incorporate geographic location and/or virtual location information in packets and or provide the information to other nodes of the network in other ways. A node may comprise a routing component for routing a packet to a next node on the way to a destination node. Such routing may comprise a selection of a next node from candidate next nodes in communication with the sending/routing node. The next node, for example, may be selected using locations associated with the candidate next nodes and a geographic location of the destination node, at least one of the locations of the candidate next nodes comprising a virtual location associated with a candidate next node.

General

The foregoing description of the embodiments of the invention has been presented only for the purpose of illustration and description and is not intended to be exhaustive or to limit the invention to the precise forms disclosed. For example, the uses of virtual locations in network routing are numerous and not limited by the examples described herein. The techniques of the invention are not limited to radio networks, AMI systems, mesh networks, or any particular network configuration. In general, numerous modifications and adaptations are apparent to those skilled in the art without departing from the spirit and scope of the invention.

That which is claimed:

1. A method comprising:
   identifying a packet destination node on a network and a geographic location of the packet destination node;
   selecting a next node for a packet sent from a sending node on the way to the packet destination node, the next node selected from candidate next nodes in communication with the sending node, wherein the next node is selected using locations associated with the candidate next nodes and the geographic location of the packet destination node, at least one of the locations of the candidate next nodes comprising a virtual location of a candidate next node, wherein the virtual location of the candidate next node is determined using geographic locations of all network nodes in direct communication with the candidate next node, wherein the virtual location is determined by averaging the geographic locations of all network nodes in direct communication with the candidate next node, the virtual location providing information about the candidate next node's current communication capabilities; and sending the packet from the sending node to the next node.

2. The method of claim 1, wherein the candidate next nodes comprise all of the nodes in communication with the sending node.

3. The method of claim 1, wherein a number of candidate next nodes is less than the number of all of the nodes in communication with the sending node.

4. The method of claim 1, wherein the next node is selected by comparing distances between the locations associated with the candidate next nodes and the geographic location of the packet destination node.

5. The method of claim 4, wherein the next node is selected because a location associated with the next node that is selected is closer to the geographic location of the packet destination node than another candidate next node.

6. The method of claim 5, wherein the next node is selected because a location associated with the next node that is selected is closer to the geographic location of the packet destination node than all other candidate next nodes.

7. The method of claim 1, wherein identifying the packet destination node comprises retrieving a node identifier from the packet.

8. The method of claim 7, wherein the node identifier identifies the geographic location of the packet destination node.

9. The method of claim 1, wherein identifying the geographic location of the packet destination node comprises retrieving a location identifier from the packet.

10. The method of claim 9, wherein the location identifier comprises geographic coordinates.

11. The method of claim 1, wherein the virtual location of the candidate next node differs from a geographic location of the candidate next node.

12. The method of claim 1 wherein the virtual location differs for the candidate next node depending upon which other nodes the candidate next node is in direct communication.

13. The method of claim 1 wherein the nodes in direct communication are nodes within radio range of a radio of the candidate next node.

14. The method of claim 1 wherein the candidate next node's current communication capabilities differ over time.

15. The method of claim 1 wherein the virtual location is determined based on the network nodes that are directly accessible by the candidate next node at a particular time, wherein different network nodes are accessible by the candidate next node at different times.

16. A method comprising:
identifying a packet destination node on a network and a geographic location of the packet destination node;
selecting a next node for a packet sent from a sending node on the way to the packet destination node, the next node selected from candidate next nodes in communication with the sending node, wherein the next node is selected using locations associated with the candidate next nodes and the geographic location of the packet destination node, at least one of the locations of the candidate next nodes comprising a virtual location of a candidate next node, wherein the virtual location is determined using a deployment characteristic of an antenna associated with the candidate next node, the virtual location providing information about the candidate next node's current communication capabilities, and wherein the virtual location of the candidate next node is determined using locations of all network nodes in direct communication with the candidate next node; and
sending the packet from the sending node to the next node.

17. A method comprising:
identifying a geographic location and a virtual location for a node of a network;
providing the geographic location and the virtual location of the node to other nodes in communication with the node on the network; and
routing a packet to the node, wherein the node is selected to receive the packet based on a relationship between the virtual location of the node and a geographic location of a destination node associated with the packet, wherein the virtual location of the node is determined using geographic locations of all network nodes in direct communication with the node, wherein the virtual location is determined by averaging the geographic locations of all network nodes in direct communication with the candidate next node, the virtual location providing information about the node's current communication capabilities.

18. The method of claim 17, wherein the node is selected to receive the packet using the virtual location of the node and virtual locations of other nodes.

19. The method of claim 17, wherein the node is selected to receive the packet using the virtual location of the node and geographic locations of other nodes.

20. The method of claim 17, wherein the node is selected to receive the packet using the virtual location of the node, virtual locations of other nodes, and geographic locations of other nodes.

21. A system comprising a network of nodes, one or more nodes of the network each comprising:
a virtual location component for determining a virtual location to be associated with the node;
an information sharing component for sharing location information with neighboring nodes, the location information comprising the virtual location; and
a routing component for routing a packet to a next node on the way to a destination node, routing comprising a selection of the next node from candidate next nodes in communication, wherein the next node is selected using locations associated with the candidate next nodes and a geographic location of the destination node, at least one of the locations of the candidate next nodes comprising a virtual location associated with a candidate next node, wherein the virtual location of the candidate next node is determined using geographic locations of all network nodes in direct communication with the candidate next node, wherein the virtual location of the candidate next node is determined by averaging the geographic locations of all network nodes in direct communication with the candidate next node, the virtual location of the candidate next node providing information about the candidate next node's current communication capabilities.

22. The system of claim 21, wherein the location information further comprises a geographic location of the node.

* * * * *